US009304695B2

United States Patent
Fujii et al.

(10) Patent No.: US 9,304,695 B2
(45) Date of Patent: Apr. 5, 2016

(54) ACCESS ROUTE SWITCHING METHOD IN DISK ARRAY SYSTEM

(71) Applicant: Hitachi, Ltd., Tokyo (JP)

(72) Inventors: Susumu Fujii, Tokyo (JP); Yoshifumi Mimata, Tokyo (JP); Takashi Itoyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 201 days.

(21) Appl. No.: 14/345,099

(22) PCT Filed: Apr. 3, 2013

(86) PCT No.: PCT/JP2013/060233

§ 371 (c)(1),
(2) Date: Mar. 14, 2014

(87) PCT Pub. No.: WO2014/162541

PCT Pub. Date: Oct. 9, 2014

(65) Prior Publication Data

US 2016/0011796 A1    Jan. 14, 2016

(51) Int. Cl.
*G06F 13/10* (2006.01)
*G06F 3/06* (2006.01)
*G06F 13/40* (2006.01)

(52) U.S. Cl.
CPC ............ *G06F 3/0613* (2013.01); *G06F 3/0635* (2013.01); *G06F 3/0689* (2013.01); *G06F 13/4022* (2013.01)

(58) Field of Classification Search
CPC .. G06F 3/0613; G06F 3/0689; G06F 13/4022

USPC .......................................................... 711/114
See application file for complete search history.

(56) References Cited

U.S. PATENT DOCUMENTS

| | | | |
|---|---|---|---|
| 7,587,429 B2* | 9/2009 | Liedes | G06F 11/1471 |
| 2001/0007124 A1* | 7/2001 | Iwamura | G06F 8/66 711/165 |
| 2005/0102603 A1* | 5/2005 | Tapper | G06F 11/2094 714/770 |
| 2007/0220204 A1 | 9/2007 | Nakajima et al. | |
| 2009/0259791 A1 | 10/2009 | Mizuno et al. | |
| 2011/0125943 A1 | 5/2011 | Oikawa et al. | |

FOREIGN PATENT DOCUMENTS

| | | | |
|---|---|---|---|
| JP | 2007-256993 A | 10/2007 | |
| JP | 2008-242872 A | 10/2008 | |
| JP | 2008-269385 A | 11/2008 | |
| JP | 2009-258841 A | 11/2009 | |

\* cited by examiner

*Primary Examiner* — Jae Yu
(74) *Attorney, Agent, or Firm* — Volpe and Koenig, P.C.

(57) ABSTRACT

In order to eliminate I/O performance bottleneck of a path in a disk array system, one expander is composed of two internal expanders connected to each other, and when the path falls in a bottleneck, connection of two internal expanders in a designated expander is cut off, and the cut-off internal expanders are connected to a new path to change access route to the disk drive. A device management table managing individual disk drives and a routing table managing access routes of respective paths are updated according to the switching of the access route.

8 Claims, 13 Drawing Sheets

FIG.5A

ROUTING TABLE BEFORE ROUTE SWITCHING

| NO. | PATH | UPPER SIDE DEVICE | TERMINAL | LOWER SIDE DEVICE | TERMINAL | INSIDE |
|---|---|---|---|---|---|---|
| 501 | 502 | 503 | 504 | 505 | 506 | 507 |
| 1 | 0 | CTL | 1 | EXP1 | 1 | 0 |
| 2 | 0 | EXP1 | 1 | EXP1 | 2 | 1 |
| 3 | 0 | EXP1 | 2 | EXP2 | 1 | 0 |
| 4 | 0 | EXP2 | 1 | EXP2-a | 1 | 1 |
| 5 | — | EXP2-a | 1 | EXP2-a | 2 | 2 |
| 6 | 0 | EXP2-a | 1 | EXP2-a | 3 | 2 |
| 7 | — | EXP2-a | 1 | EXP2-a | 4 | 2 |
| 8 | — | EXP2-a | 2 | EXP2 | 3 | 1 |
| 9 | 0 | EXP2-a | 3 | EXP2-b | 1 | 1 |
| 10 | 0 | EXP2-b | 1 | EXP2-b | 3 | 2 |
| 11 | — | EXP2-b | 2 | EXP2-b | 3 | 2 |
| 12 | — | EXP2-b | 4 | EXP2-b | 3 | 2 |
| 13 | — | EXP2-a | 4 | EXP2 | 5 | 1 |
| 14 | — | EXP2 | 2 | EXP2-b | 2 | 1 |
| 15 | 0 | EXP2-b | 3 | EXP2 | 4 | 1 |
| 16 | — | EXP2 | 6 | EXP2-b | 4 | 1 |
| 17 | 0 | EXP2 | 4 | EXP3 | 1 | 0 |
| 18 | | | | | | |
| 19 | | | | | | |

(EXP: EXPANDER, CTL: SAS CONTROLLER)

INTERNAL ROUTE IDENTIFIER: 0=OUTSIDE EXP
　　　　　　　　　　　　1=INSIDE EXP BUT OUTSIDE ENTERNAL EXP
　　　　　　　　　　　　2=INSIDE INTERNAL EXP

ROUTE OF PATH 0: 1-2-3-4-6-9-10-15-17

FIG.5B

ROUTING TABLE BEFORE ROUTE SWITCHING

| NO. | PATH | UPPER SIDE DEVICE | TERMINAL | LOWER SIDE DEVICE | TERMINAL | INSIDE |
|---|---|---|---|---|---|---|
| 1 | 0 | CTL | 1 | EXP1 | 1 | 0 |
| 2 | 0 | EXP1 | 1 | EXP1 | 2 | 1 |
| 3 | 0 | EXP1 | 2 | EXP2 | 1 | 0 |
| 4 | 0 | EXP2 | 1 | EXP2-a | 1 | 1 |
| 5 | 0 * | EXP2-a | 1 | EXP2-a | 2 | 2 |
| 6 | — * | EXP2-a | 1 | EXP2-a | 3 | 2 |
| 7 | — | EXP2-a | 1 | EXP2-a | 4 | 2 |
| 8 | 0 * | EXP2-a | 2 | EXP2 | 3 | 1 |
| 9 | — * | EXP2-a | 3 | EXP2-b | 1 | 1 |
| 10 | — * | EXP2-b | 1 | EXP2-b | 3 | 2 |
| 11 | 1 * | EXP2-b | 2 | EXP2-b | 3 | 2 |
| 12 | — | EXP2-b | 4 | EXP2-b | 3 | 2 |
| 13 | — | EXP2-a | 4 | EXP2 | 5 | 1 |
| 14 | 1 * | EXP2 | 2 | EXP2-b | 2 | 1 |
| 15 | 1 * | EXP2-b | 3 | EXP2 | 4 | 1 |
| 16 | — | EXP2 | 6 | EXP2-b | 4 | 1 |
| 17 | 1 * | EXP2 | 4 | EXP3 | 1 | 0 |
| 18 | 1 * | CTL | 2 | EXP2 | 2 | 0 |
| 19 | 0 * | EXP2 | 3 | ??? | ? | 0 |
|  |  |  |  |  |  |  |
|  |  |  |  |  |  |  |

ROUTE OF PATH 0: 1-2-3-4-5-8-19
ROUTE OF PATH 1: 18-14-11-15-17
("*" IS DATA CHANGED OR ADDED BY ROUTE SWITCHING)

FIG. 6

| RAID GROUP # | EXPANDER | DRIVE # | SAS ADDRESS | AFFIL- IATION PATH |
|---|---|---|---|---|
| 0 | EXPANDER 2-a | 1 | A | 0 |
| | | : | : | : |
| | | m | M | 0 |
| 1 | EXPANDER 2-b | m+1 | M+1 | 1 |
| | | : | : | : |
| | | n | N | 1 |

601 602 603 604 605

610 620

ACCESS ROUTE SWITCHING METHOD IN DISK ARRAY SYSTEM

TECHNICAL FIELD

The present invention relates to an access route switching method in a disk array system. In particular, the present invention relates to an access route switching method for eliminating a bottleneck of a path to which an expander connected with a plurality of disk drives is connected in a daisy-chain fashion.

BACKGROUND ART

In a configuration where a plurality of disk drives is connected to a backend of a disk array in a disk array system, many disks are caused to be associated with one another by providing a switch device called "expander" and connecting the disk drives to the expander.

PTL 1 discloses that, when a casing including an expander is newly added in such a system, Discovery Process of SAS (Serial Attached SCSI) is performed.

CITATION LIST

Patent Literature

PTL 1: Japanese Patent Application Laid-Open No. 2008-242872

SUMMARY OF INVENTION

Technical Problem

In the above-described disk array system, the following problems arise according to increase of the number of drives mounted on a disk drive casing.

(1) I/O performance bottleneck occurrence of a path:

When many disk drives are connected to the expander, since I/O (inputs/outputs) are concentrated on a path to a controller connected with the expander, a bottleneck of the I/O performance of the path occurs, so that the performance of the plurality of disk drives cannot be sufficiently exerted.

(2) Load increase due to Discovery Process:

When another expander is connected in order to eliminate the above-described bottleneck (1), Discovery Process of SAS for examining an added device or the like is performed, and a large amount of processing for device searching is performed, which results in increase of a load on the entire system.

Solution to Problems

The present invention is applied to a disk array system where a plurality of expanders, each being connected with a plurality of disk drives, is connected in a daisy-chain fashion from an SAS controller within a disk array device connected to a host computer to configure one path. In order to solve the above problem, one expander is composed of two internal expanders connected to each other, and when the path falls in a bottleneck, the two internal expanders in a designated expander are disconnected from each other, and the internal expanders which have been disconnected are connected to a new path from the SAS controller, thereby performing switching of an access route to the disk drive. A device management table managing individual disk drives and a routing table managing an access route to each path are updated according to switching of the access route.

Advantageous Effects of Invention

According to the present invention, an I/O bottleneck can be eliminated by changing a configuration of an expander connected with a plurality of disk drives belonging to respective paths without performing Discovery Process requiring a large amount of processing.

BRIEF DESCRIPTION OF DRAWINGS

FIG. 5A is a diagram showing a routing table before route switching;

FIG. 5B is a diagram showing a routing table after route switching;

FIG. 6 is a diagram showing a device management table;

DESCRIPTION OF EMBODIMENTS

Example 1

(1) System Configuration

Figure 1:
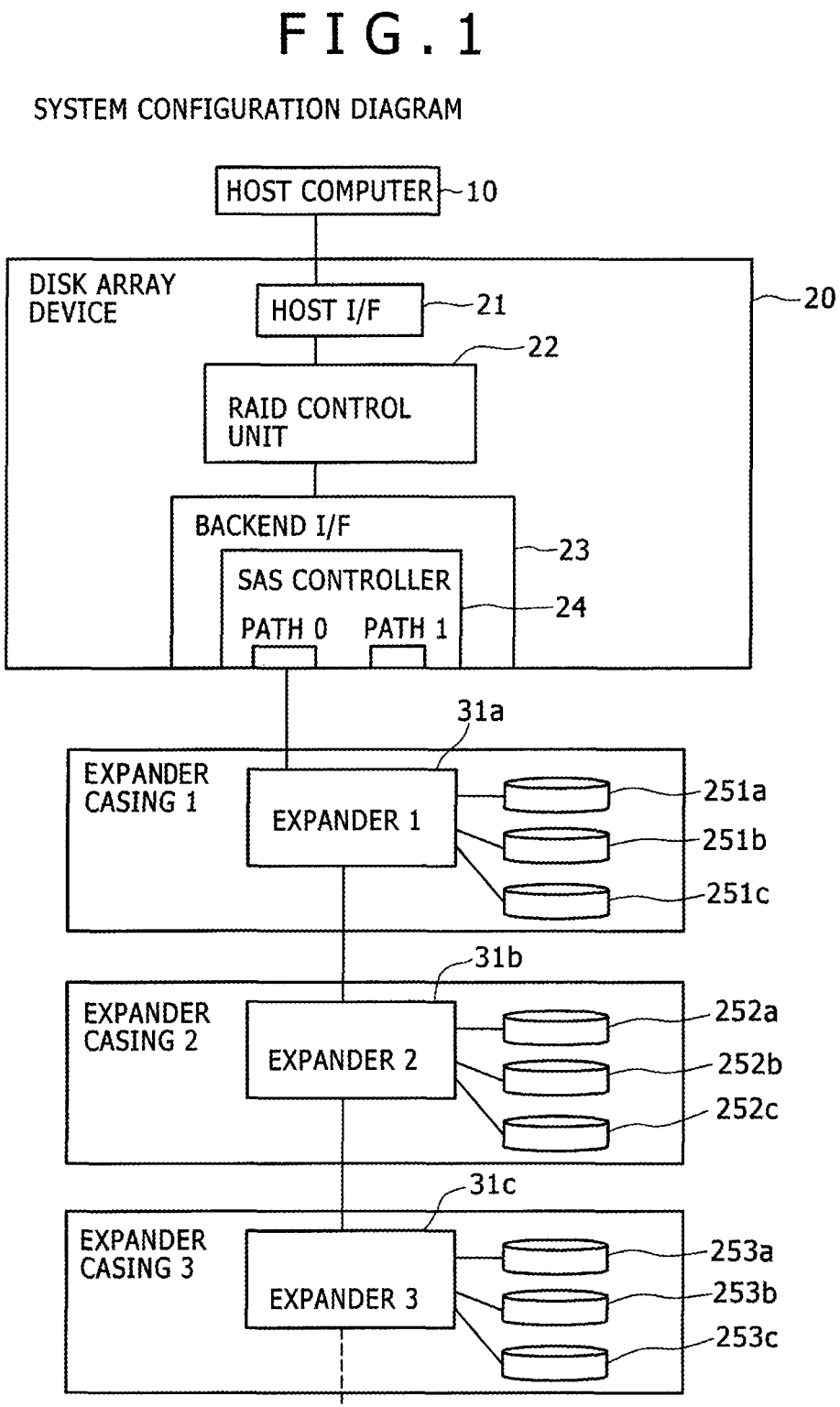
FIG. 1 is a diagram showing a configuration of a disk array system.

A configuration of a disk array system in Example 1 is shown in FIG. 1. In the disk array system, a disk array device 20 is connected to a host computer 10, and a plurality of expander casings 1, 2 and 3 of a disk array device is further connected to the disk array device 20 in series. Incidentally, in this Example, one expander is provided in each expander casing.

(1-1) Disk Array Device

The disk array device 20 has a host I/F 21 performing input and output (or I/O) control with the host computer 10, an RAID (Redundant Array of Independent Disks) control unit 22, and a backend I/F 23 performing input and output control with the expander casings, and the backend I/F 23 has an SAS controller performing input and output control to a path 0 and a path 1.

The expander casing 1 has a plurality of disk driving devices 251a to 251c and an expander 1 (31a). The expander 1 (31a) performs control of the respective disk driving devices 251a to 251c and input and output control with the disk array device 20 and the expander casing 1. The expander casing 2 and the expander casing 3 also have a configuration similar to that of the expander casing 1.

Hereinafter, connection from the expander casing 1 to the side of the disk array device 20 is called "upper" and connection from the expander casing 1 to the side of the expander casing 2 is called "lower". This holds true for the expander casing 2 and the expander casing 3.

Figure 2:
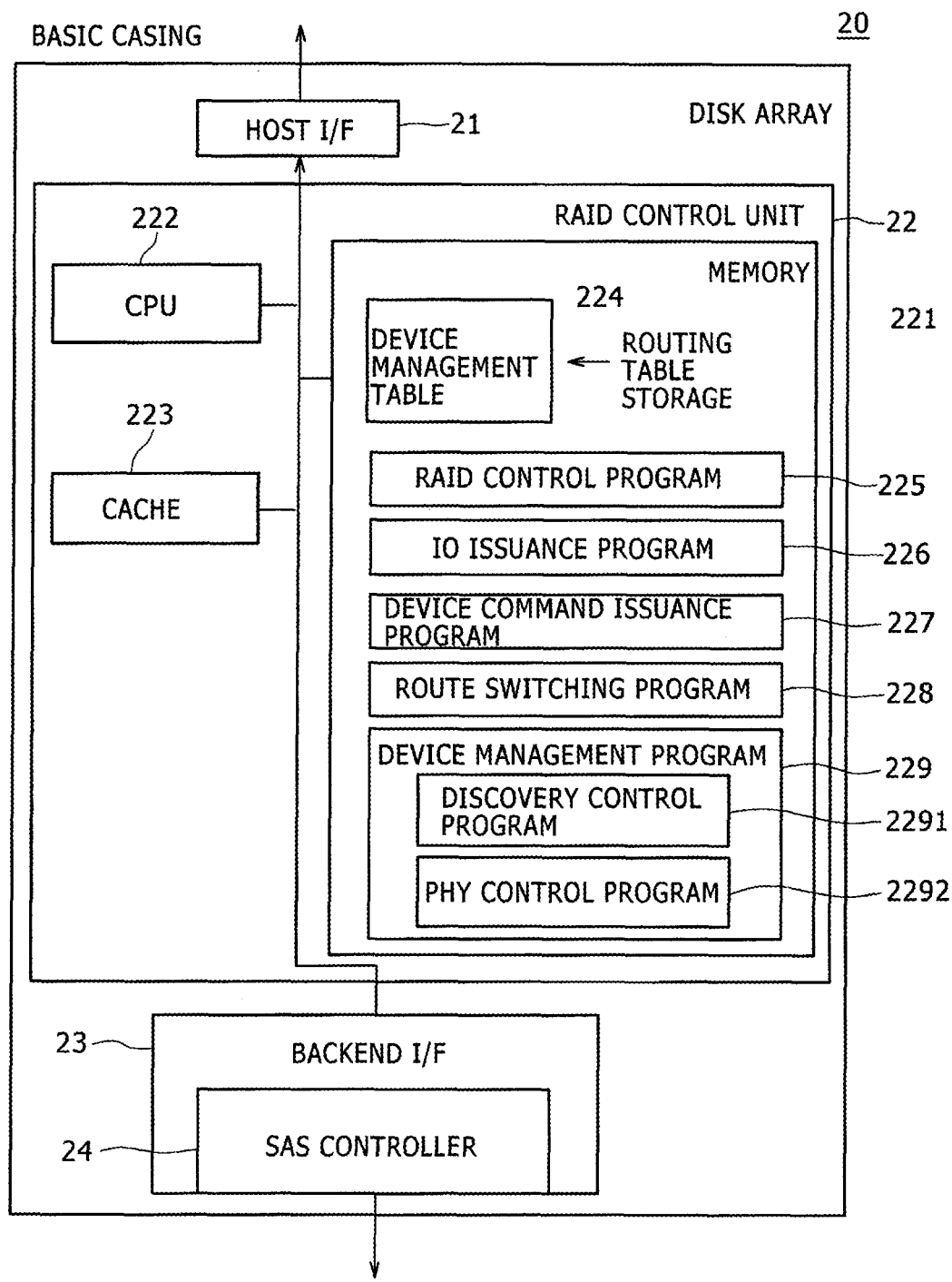
FIG. 2 is a diagram showing a configuration of a disk array device.

A configuration of the disk array device 20, especially, a configuration of the RAID control unit 22 is shown in FIG. 2. The RAID control unit 22 has a memory 221, a CPU 222, and a cache memory 223. In addition to a device management table 224 (a routing table described later is also stored) and a route switching program 228 associating with route switching in this Example, an RAID control program 225, an IO issuance program 226, a device command issuance program 227, and a device management program 229 are stored in the memory 221, and the CPU 222 executes these programs. The device management program 229 includes a Discovery control program 2291 and a PHY control program 2292.

In this Example, a configuration using the disk driving device will be described, but the present invention can also be applied to a configuration having an SSD (Solid State drive) using a flash memory as a storage medium.

(1-2) Expander

Figure 3:
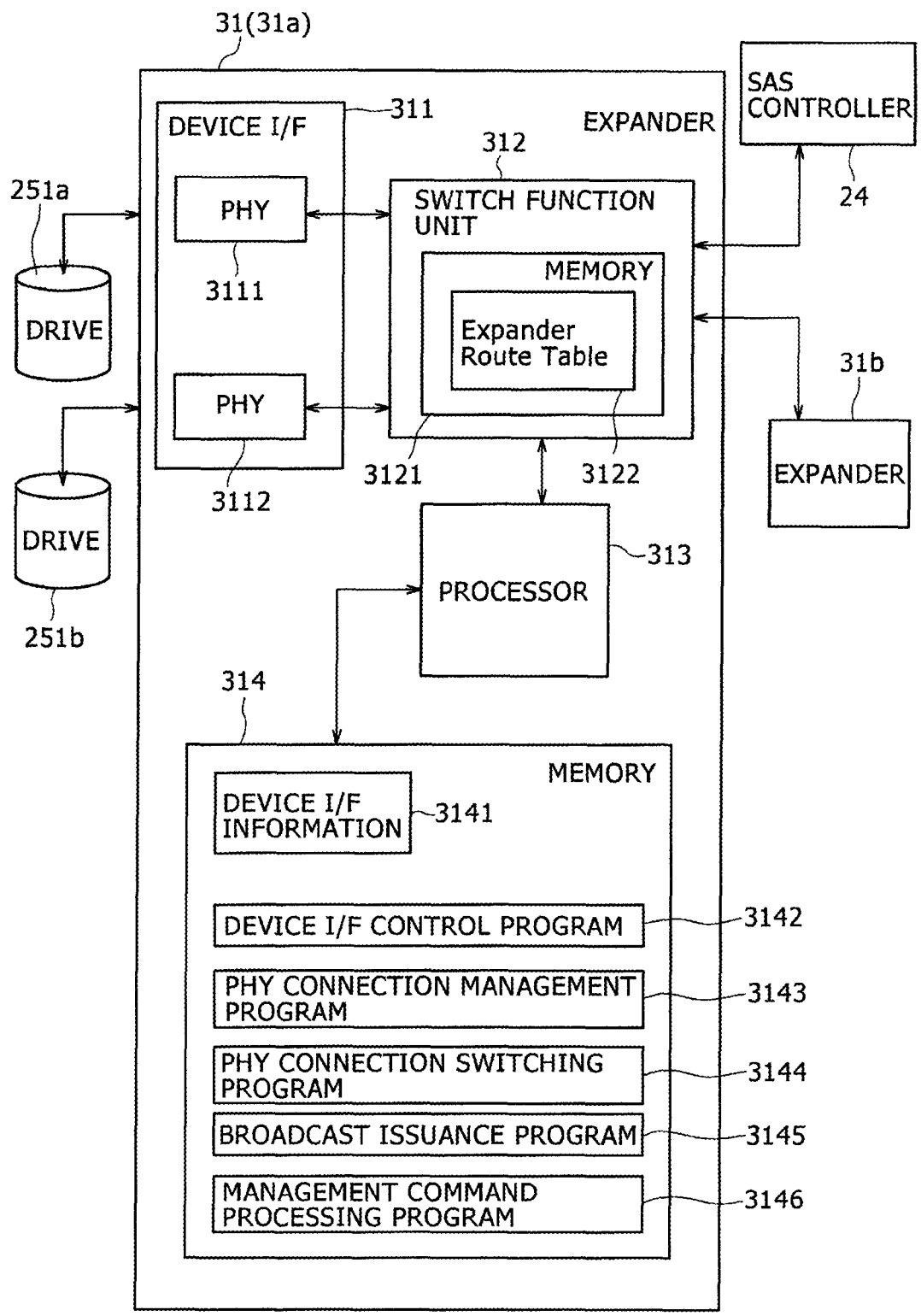
FIG. 3 is a diagram showing a configuration of an expander.

A configuration of the expander 31a in the expander casing 1 is shown in FIG. 3. The expander 31a has a device I/F 311 controlling input and output control with the disk driving devices 251 within the expander casing 1, a switch function unit 312 controlling connection with an upper side device and a lower side device, a CPU 313 controlling the switch function unit 312, and a memory 314. The device I/F 311 includes PHY 3111 and PHY 3112 which are physical connections with respective disk driving devices 251.

An Expander Route Table 3122 managing connection with the upper side device and the lower side device is stored in a memory 3121 of the switch function unit 312. The upper side device of the expander 31a is the SAS controller 24 of the disk array device 20, while the lower side device of the expander 31a is an expander 31b within the expander casing 2. The upper side device of the expander 31b is the expander 31a within the expander casing 1, while the lower side device of the expander 31b is an expander 31c within the expander casing 3.

A Phy connection management program 3143 and a Phy connection switching program 3144 which are associated with the route switching of this Example in the expander casing 1 are stored in the memory 314, and a device I/F information 3142, a device I/F control program 3142, a broadcast issuance program 3145, and a management command processing program 3146 which are associated with input and output control with the disk driving devices 251 within the expander casing 1 are further stored in the memory 314.

The expander 31b within the expander casing 2 and the expander 31c within the expander casing 3 also have a configuration similar to that shown in FIG. 3.

When the SAS controller 24 of the disk driving device 20 controls the route switching of this Example, a path is set to a switching control mode different from an ordinary I/O control and a command for controlling connection within the expander 31 is sent to the expander 31 via a path from the SAS controller 24. When an object whose connection should be controlled is internal expanders 401 and 402, a connection control command is sent to the internal expanders 401 and 402 from the expander 31.

(2) Data (2-1) Routing Table

Figure 4A:
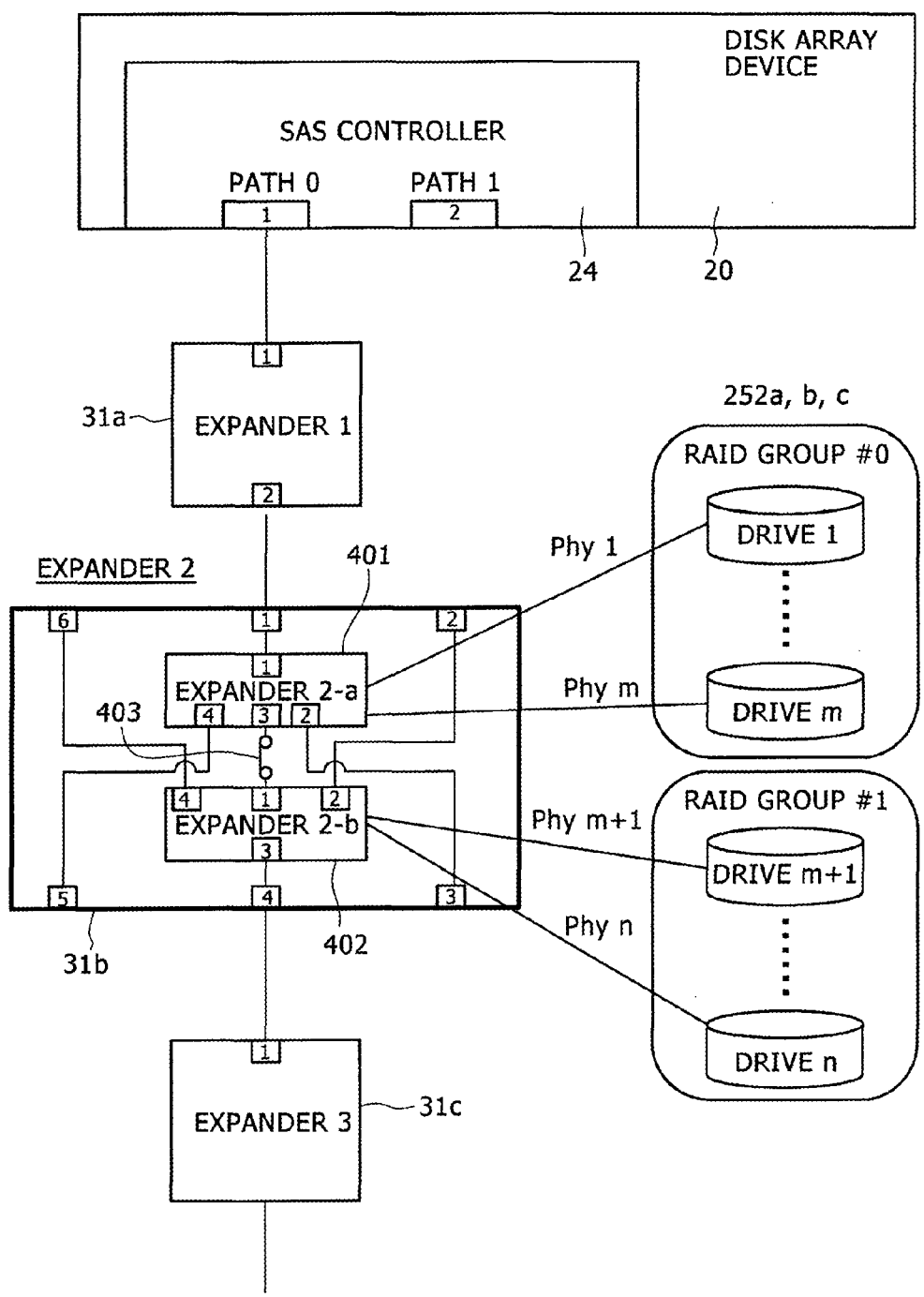
FIG. 4A is a diagram showing a cable connection before route switching.
Figure 4B:
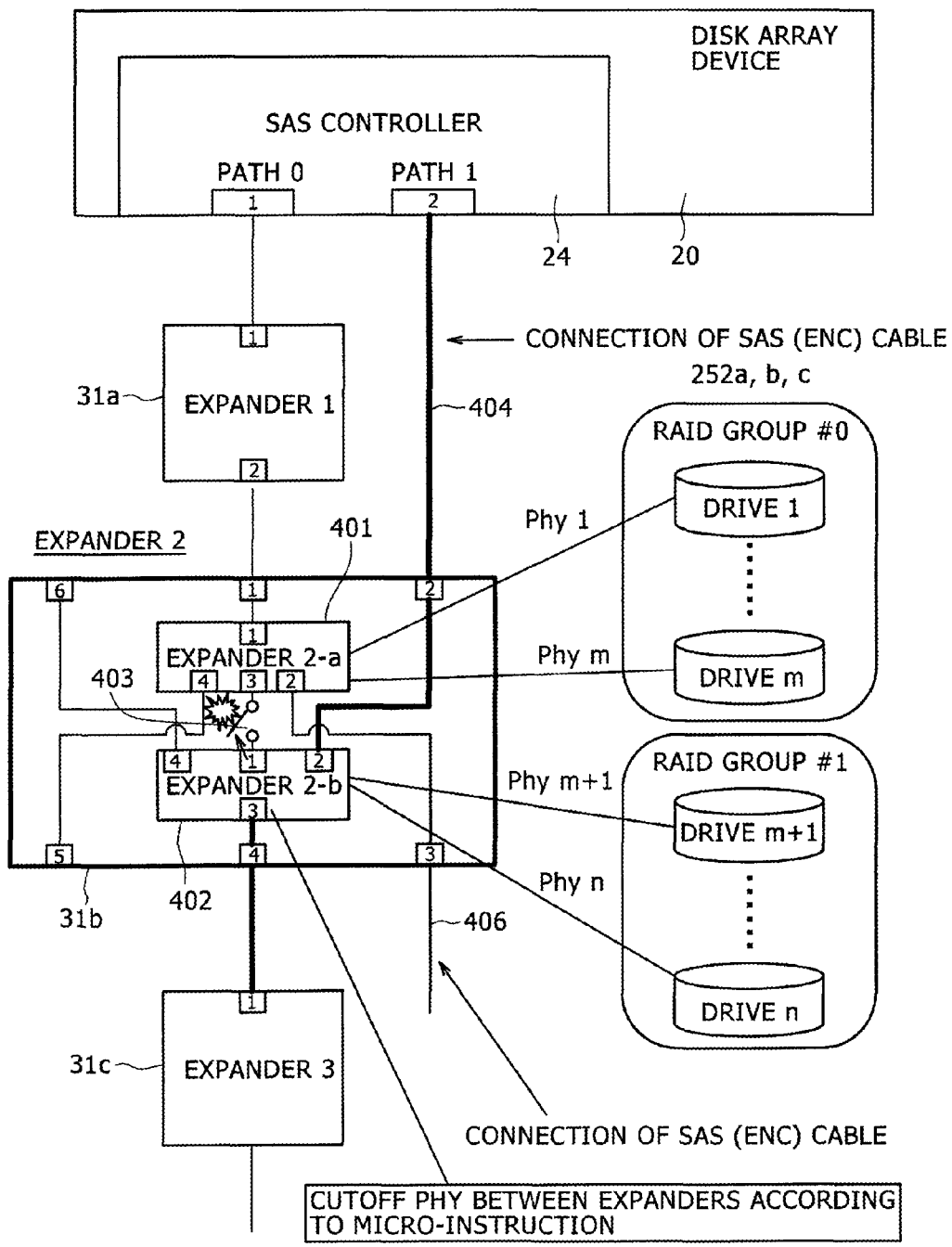
FIG. 4B is a diagram showing a cable connection after a route switching.

Routing tables for managing connection relationships of respective units in a route from the disk array device 20 shown in FIG. 1 to the expander casing 1, the expander casing 2, and the expander casing 3, specifically, in a route from the SAS controller 24 to the expander 1(31a), the expander 2(31b), and the expander 3 (31c) are shown in FIG. 5A and FIG. 5B. FIG. 5A is a routing table before route switching in this Example, while FIG. 5B is a routing table after route switching in this Example. The routing tables are held by the RAID control unit 22 of the disk array device 20, and information corresponding to cable connections before route switching shown in FIG. 4A is prepared by a user through a management terminal. The routing tables shown in FIG. 4A and FIG. 4B are also transferred to the respective expander casings 1 to 3 to be referred to in controls in the respective internal expanders (401, 402).

Each row of the routing tables corresponds to a route element constituting a route, and each route element is represented as a connection relationship between terminals of respective devices. No. (501) denotes the number of a route element and numbers are basically sequentially attached from an upper side route element, but when a new route element is added according to route switching, this general rule is not applied necessarily. Further, since a route element which has become unnecessary according to a route switching may be reused according to route switching performed thereafter, the route element is left it is. A path 502 is information for identifying an access path from the disk array device 20 to the disk driving devices 251 to 253, and as the path, there are two paths of a path 1 and a path 2 in this Example. The path 502 indicating "-" shows that the route element is not used in any path (non-use). Specifically, the "-" shows a state that the route element has been physically cut off, or it is put in a physical connection state but a signal is not being transmitted through the route element.

An upper side device 503 and a terminal 504 represent a contact point on the upper side of the route element, while a lower side device 505 and a terminal 506 represent a contact point on the lower side of the route element. The upper side device 503 and the lower side device 505 are identifiers of devices, for example, "EXP" represents the expander 31, and "CTL" represents the SAS controller 24. Hereinafter, an expander is abbreviated to "EXP", and an SAS controller is abbreviated to "CTL". The terminals 504 and 506 are each a number allocated to at least one terminal within each device in the upper side device 503 or the lower side device 505. Each of the numbers of terminals 504 and 506 is not a number which has been actually allocated to an actual terminal of each device, but it is a virtual number which has been allocated for control for route switching in this Example, and even if a terminal is not present as an actual member, a number is allocated to a terminal virtually provided for defining a route element.

Inside 507 is an internal route identifier for identifying whether the route element is positioned outside or inside the EXP 31, and it distinguishes where the path 502 is changed. When the route element is positioned outside the EXP 31, distinction is made as Inside=0, and when the route element is positioned inside the EXP 31, distinction is made as Inside=2. As described later (FIG. 4), in the case that two internal EXPs 401 and 402 are connected in series in one EXP 31, when the route element is present inside the EXP 31 but it is positioned outside the EXPs 401 and 402, distinction is made as Inside=1. The route element of the Inside="0" is a cable which can be newly attached or detached by a user. The route element of Inside="1" is a wire which is controlled about whether or not a signal can be transmitted by the EXP 31. The route element of Inside="2" is a wire where connection between terminals in the Internal EXPs 401 and 402 is changed. Therefore, the route element of Inside="1" or "2" is controlled by the Phy connection switching program 3144 which has received an instruction from the route switching program 228.

Before and after route switching, only the path 502 is changed but items 503 to 507 defining contents of a route element are not changed. However, when a new route element is added after the route switching, items 503 to 507 are added.

The mark "*" described in the path 502 in FIG. 5B shows change or addition performed by the route switching. That is, the mark "*" shows a change or addition part from the routing table before route switching, shown in FIG. 5A.

By using the routing tables shown in FIGS. 5A and 5B, connection relationship can be changed and a device associated with the change of the connection relationship can be specified for each route element constituting a route of each path.

(2-2) Device Management Table

A device management table which manages correspondence relationship between the disk driving devices 251 to 253 respectively controlled by the EXP 1 to EXP 3 (31a to 31c) shown in FIG. 1 and the RAID group is shown in FIG. 6. The table shown in FIG. 6 is composed of an RAID group #601, an identifier 602 of the EXP, a drive (disk driving device) #603, an SAS address 604 managed by the whole disk array system, and an affiliation path 605 for assessing the disk driving device. Unique numbers over the disk array system are allocated to the drive #603 and the SAS address 604.

A row 610 in FIG. 6 shows that the SAS address of the RAID group #1 belonging to the path 0 has been reset to the path 1 by connecting the SAS cable (inter-casing connection cable) to the side of the path 1 (620).

By the device management table shown in FIG. 6, a corresponding relationship among the expander, the disk driving device, the SAS address, and the path can be managed for each RAID group.

(3) Processing Flow (3-1) Whole Sequence of Route Switching Processing
(3-1-1) Before Route Switching The case where the EXP 2 (31b) shown in FIG. 1 has a configuration where two internal EXPs 401 and 402 have been connected to each other in series in the EXP 2 (31b) is shown in FIG. 4A. An internal EXP 2-a (401) controls the disk drive devices (drives 1 to m) of the RAID group #0 via physical connections Phy 1 to m, and the internal EXP 2-b (402) controls the disk driving devices (drives m+1 to n) via physical connections Phy m+1 to n. The EXP 2 (31b) is connected to the path 0 of the SAS controller 24 via the EXP 1 (31a). The EXP 1 (31a) and the EXP 3(31c) each also have two internal EXPs like the EXP 2 (31b).

The EXP 1 to EXP 3 (31a to 31c), and internal EXP 2-a (401) and EXP 2-b (402) have terminals virtually provided for defining a route element, as described in the explanation about the routing tables shown in FIGS. 5A and 5B. These terminals shown by enclosing a number with a small rectangle correspond to terminals of cables or wires. The numbers of the above-described terminals in FIG. 4A are shown with a bracket [ ].

A terminal [3] of the internal EXP 2-a (401) and a terminal [1] of the internal EXP 2-b (402) are connected to each other by a switch 403, and the switch 403 is also a route element. The switch is not limited to a physical switch, but it may be configured to control current conduction and cutoff according to the Phy connection switching program 3144.

The above-described terminals include terminals which are connected to each other but are not used. For example, as shown in FIG. 4A, the terminal [2] of the EXP 2 (31b) and the terminal [2] of the internal EXP 2-b (402) are connected to each other but they are not used.

when a route from the uppermost CTL 24 to the path 0 is traced using the routing table in FIG. 5A, the route of the path 0 shown in FIG. 4A becomes 1-2-3-4-6-9-10-15-17 using the route No. (501). The route of the path 0 can be obtained by exploring a route including an upper side device 503 and the terminal 504 having the same device identifier and terminal number as the lower side device 505 and the terminal 506 in FIG. 5A and having the same path as the path 502 and coupling the former No. (501) and the latter No. (501) to each other. At this time, the rows where the path is represented by "-" are eliminated from objects to be explored.

Incidentally, when the path 502 of the route element is changed from "0" or "1" to "-", namely, when the route element is put in a disconnected state, disconnection processing is performed by the upper side device 503 of the route element. Similarly, when the path 502 of the route element is changed from "-" to "0" or "1", namely, when the route element is put in a connected state, connection processing is performed by the upper side device 503 of the route element.

(3-1-2) After Route Switching

FIG. 4B shows a configuration where because the path 0 includes a large I/O amount, the I/O amount is dispersed by adding an SAS cable 404 to provide a new path 1 extending from the CTL 24. As compared with the configuration shown in FIG. 4A, the switch 403 between the terminal [3] of the internal EXP 2-a (401) and the internal EXP 2-b (402) is set OFF, and the terminal [2] of the CTL 24 and the terminal [2] of the EXP 2 (31b) which is not used in the configuration shown in FIG. 4A are connected to each other by the added SAS cable 404 in the configuration shown in FIG. 4B. Further, the EXP 2-b (402) and the EXP 3 (31c) positioned on the lower side thereof are connected to the path 1 using a route element connecting the terminal [2] of the EXP 2 (31b) and the terminal [2] of the internal EXP 2-b (402), the route element being not used in the configuration shown in FIG. 4A. Further, the terminal [3] of the EXP 2 (31b) and the cable 406 are connected to configure a path 0 using a route element connecting the terminal [2] of the internal EXP 2-a (401) and the terminal [3] of the EXP 2 (31b), the route element being not used in the configuration shown in FIG. 4A.

In the configuration shown in FIG. 4A, the terminal [1] and the terminal [3] are connected to each other inside the internal EXP 2-a (401) and the terminal [1] and the terminal [3] are connected to each other inside the internal EXP 2-b (402). On the other hand, in the configuration shown in FIG. 4B, the terminal [1] and the terminal [2] are connected to each other inside the internal EXP 2-a (401) and the terminal [2] and the terminal [3] are connected to each other inside the internal EXP 2-b (402).

A routing table after the above-described route switching is shown in FIG. 5B. Data (row) changed or added by the route switching shown in FIG. 4B is shown by the mark "*" like FIG. 5B. For example, since, by route switching, the path of the route element "5" is changed from "non-use" to "0", the path of the route element "6" is changed from "0" to "non-use", and each in the Inside 507 is "2", it is understood that the internal expanders 401 and 402 get involved in this changing. Further, since the path of the route element "15" is changed from "0" to "1" and the Inside 507 is "1", it is understood that the expander 31 gets involved in this changing. Since a route element "18" where the path is "1" and a route element "19" where the path is "0" are added, and each in the Inside 507 is "0", it is understood that a cable connection change performed by a manual operation gets involved in this changing.

By the route switching shown in FIG. 4B, the route of the path 0 is represented as 1-2-3-4-5-8-19 using the No. (501), and the route of the path 1 is represented as 18-14-11-15-17.

Figure 7:
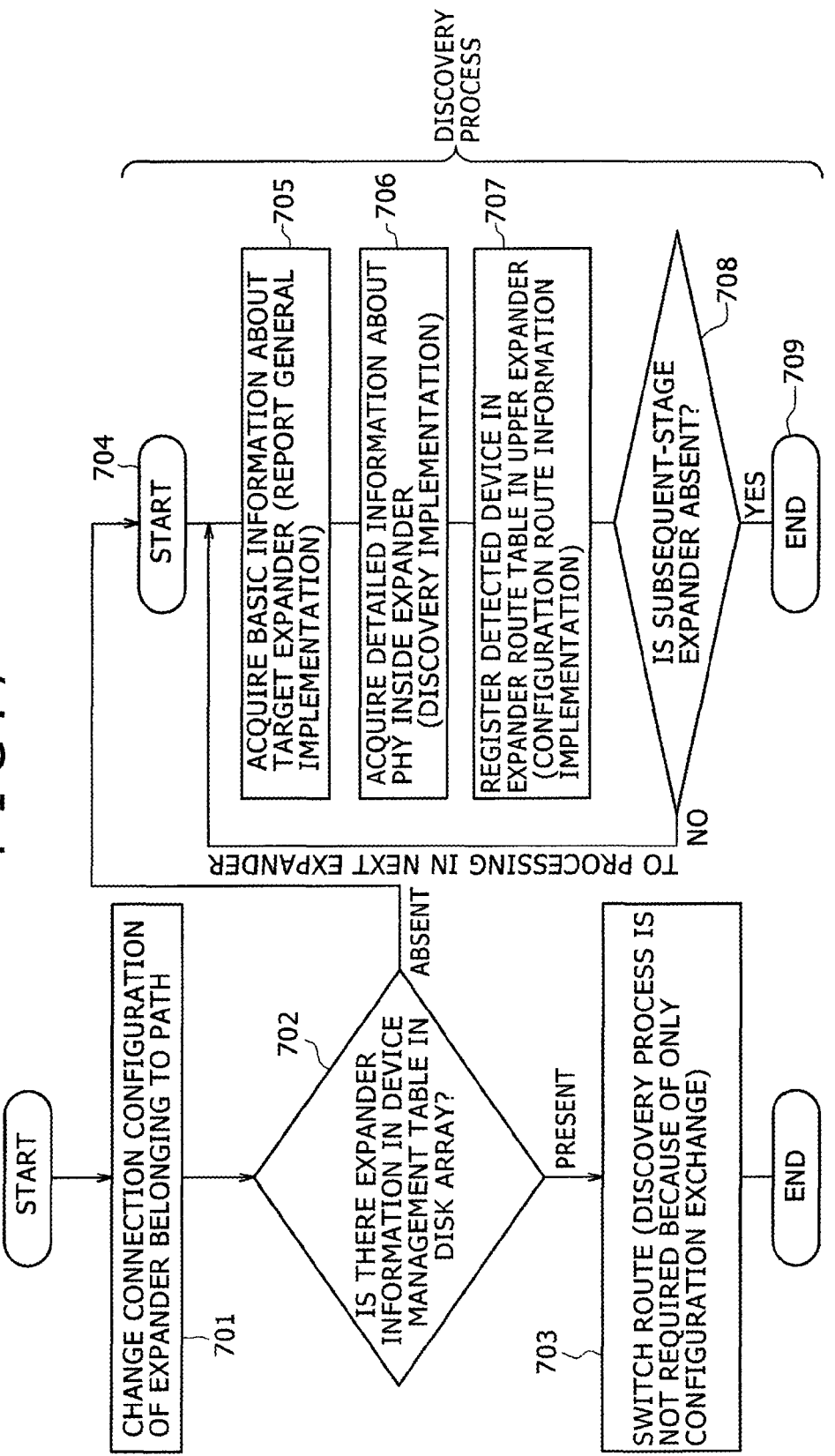
FIG. 7 is a diagram showing a relationship between a route switching process and Discovery Process.

(3-2) Processing Flow of a Route Switching Program (3-2-1) Relationship Between Route Switching Processing and Discovery Process:

A processing flow of the route switching program 228 shown in FIG. 3 is shown in FIG. 7. FIG. 7 shows processing performed before a whole sequence of the route switching process described in the above-described item (3-1) is performed.

First, presence or absence of change of a connection configuration of an expander belonging to a path is inputted by a user (701). Here, information about whether or not a device (an expander, a disk driving device, or the like) is added or whether or not connection is changed without adding a device is inputted. Next, whether or not expander information is included in the device management table (FIG. 6) of the disk array is determined (702); when no added device is present but expander information is present, the route switching processing described in the above item (3-1) is performed (703); when an added device is present but no expander information is present, Discovery Process (704 to 709) is performed to examine the added device, thereby setting information about the expanders belonging to all the paths in the device management table shown in FIG. 6. The Discovery Process (704 to 709) is initial setting processing for performing route switching processing.

Figure 8:
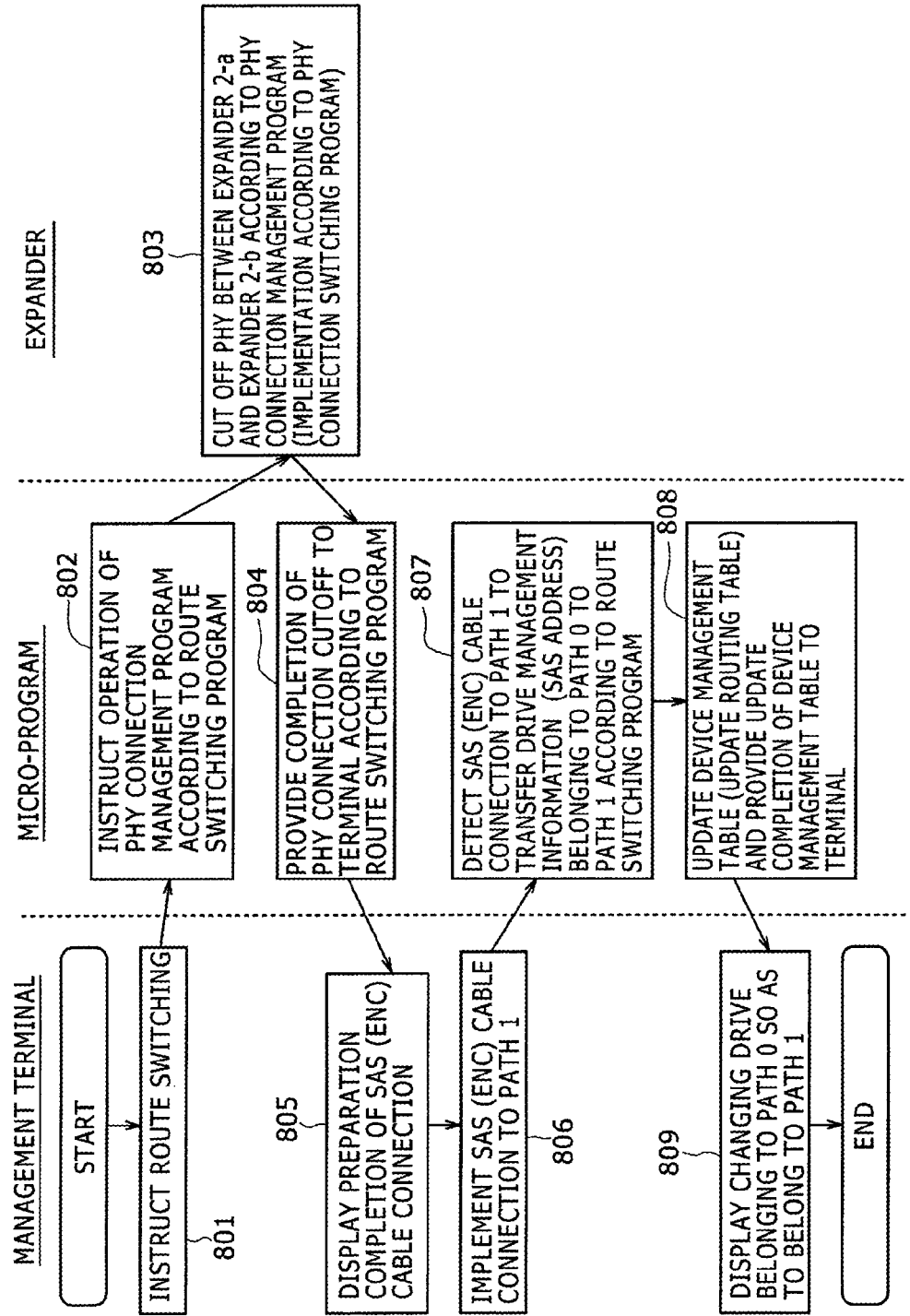
FIG. 8 is a diagram showing a processing flow of a whole route switching process.

(3-2-2) Processing Flow of Whole Route Switching Processing:

FIG. 8 shows association of processing with a management terminal (not shown) of the host computer 10 or the disk array device 20, a route switching program which is a micro-program, and programs (the Phy connection management program 3143, the Phy connection switching program 3144) within the expander 31. Processing corresponding to the route switching shown in FIG. 4A and FIG. 4B will be described below.

First, route switching is instructed from the management terminal (801). The instruction for route switching is composed of a new path (path 1) and a connection position of a new cable (namely, the number of the upper side device and the connection terminal thereof, and the numbers of the lower side device and the connection terminal thereof) as alternative to the route of the original path (path 0). The route switching program 228 transmits an operation instruction of the Phy connection management program 3143 to the expander 31 based upon the instruction for route switching (802). The expander 31 cuts off the Phy connection between the internal expander 2-*a* (401) and the internal expander 2-*b* (402) according to the Phy connection management program 3143 and it provides cutoff completion of the Phy connection to the micro-program (803). The route switching program 228 provides cutoff completion of the Phy connection to the management terminal (804). The management terminal displays preparation completion of the SAS cable connection thereon (805).

When the user implements the SAS cable connection so that notification of connection implementation is sent from the management terminal to the route switching program 228 (806), the route switching program 228 detects SAS cable connection to the path 1 to transfer drive management information (SAS address) 604 belonging to the path 0 to the path 1 (807). As a result, the device management table shown in FIG. 6 is updated according to the route switching program 228, the routing table shown in FIG. 5A is updated to the routing table shown in FIG. 5B, and update completion of the device management table is then provided to the management terminal (808). The management terminal displays such a fact that the drive (the RAID group #1 of the disk driving device 252) belonging to path 0 has been changed so as to belong to the path 1 based upon the notification of the update completion.

Figure 9:
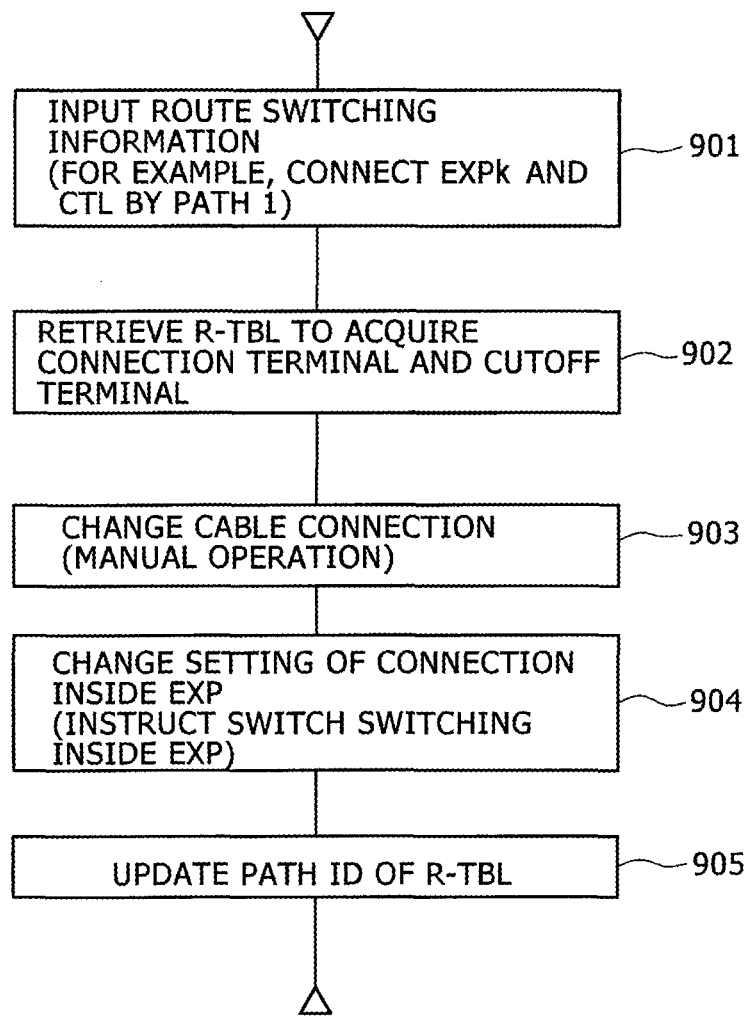
FIG. 9 is a diagram showing a detailed flow of the route switching process.

(3-2-3) Detailed Flow of Route Switching Processing:

FIG. 9 shows detailed processing of the route switching program 228.

First, for example, such route switching information that an expander 31 (EXP k) and the SAS controller 24 (CTL) are connected to each other by the path 1 is inputted (901). The information is specifically the route switching instruction described in the processing 801 shown in FIG. 8.

Connection terminals (terminals 504 and 506 of the route element where the path 502 shown in FIG. 5A is changed from "-" to "0/1") and cutoff terminals (terminals 504 and 506 where the path 502 shown in FIG. 5A is changed from "0/1" to "-") associated with cutoff portions are acquired retrieving the routing table 5A (902). The retrieval of the routing table is performed according to the following procedure, as described in the above item (3-1-1).

That is, regarding the path to be subjected to the route switching, retrieval of rows (route elements) including the uppermost device (CTL) in the upper side devices of the routing table shown in FIG. 5A is performed, and a row (a route element) including the same device as the lower side device 505 in the same row and having the same path as the path to be subjected to the route switching is retrieved. This retrieval processing is sequentially performed to determine whether or not the expander 31 (EXP k) (which may be the internal expander 401 or 402) to be subjected to the switching is included in the retrieved route, and when the expander (EXP k) is included in the retrieved route, the upper side or the lower side of the EXP k is designated as a cutoff portion, and a connection terminal and a cutoff terminal of the retrieved route are acquired. (Regarding an example of how to determine a cutoff portion, please refer to Example 4 described later.) When the cutoff portion of the EXP k is positioned on the upper side of the EXP k, a terminal 506 corresponding to the lower side device 505 of the retrieved row (route element) is the cutoff portion. When the cutoff portion of EXP k is positioned on the lower side of EXP k, a row including an upper side device and a terminal where an upper side device 503 and a terminal 504 corresponding thereto are equal to the lower side device 505 and the terminal 506 corresponding thereto in the retrieved row (route element) is further retrieved so that the terminal 506 of the lower side device 505 in the retrieved row (route element) is the cutoff portion. The above-described row further retrieved is a route element corresponding to a wire within the expander 31 (EXP k) to be subjected to switching.

Change of cable connection between the SAS expander 24 and the expander 31 or within the expander 31 is performed by a user's manual operation (903).

Setting change of connection within the expander is performed (904). That is, the route switching program 228 instructs control of current conduction or cutoff of a wire corresponding to a route element associated with the route switching in the expander 31 to the Phy connection switching program 3144 of the associated expander 31 based upon the routing table shown in FIG. 5A.

The routing table before route switching shown in FIG. 5A is updated corresponding to the above processing 903 and 904 to create the routing table after route switching shown in FIG. 5B (905). Updating of the routing table is performed according to the following procedure, as described in the above item (3-1-2).

That is, regarding the path (path 0) to be subjected to route switching, the following processing is performed according to whether the expander 31 (EXP k) to be subjected to switching is positioned on the upper side or the lower side of the EXP k. In the following, a terminal of the expander 31 (EXP k) to be subjected to switching is represented as "P" or "P'" and a terminal of an upper side or lower side device of the EXP k is represented as "Q" or "Q'". Further, in the following, the path 0 may be represented as "original path" and the path 1 may be represented as "new path". When Inside 507 on the routing table is "0", connection/cutoff of a cable is manually performed, and addition or change of information about the route element depending on the operation is performed by an upper side device. When Inside 507 is "1", cutoff of a route element or connection change of a terminal is controlled by the EXP, and when Inside 507 is "2", the expander instructs the internal expander included therein such that the internal expander controls cutoff of the route element or connection change of the terminal.

(A) Case where a cutoff portion is positioned on the upper side of the EXP k:

(A1) An upper side device (EXP m) 503 connected to the upper of the EXP k and a terminal corresponding thereto are acquired retrieving the routing table shown in FIG. 5A to cut off connection between the terminal [Q] of the EXP m and the terminal [P] of the EXP k. That is, the path 502 of the route element corresponding to this connection is changed from "0" to "-" (non-use). Further, cutoff of connection between the terminal [Q] of the EXP m and the terminal [P] of the EXP k is performed by the EXP m which is the upper side device. (Detection of cutoff portion and cutoff)

(A2) A cable or a wire constituting a route for a new path (path 1) is connected to a terminal [P'] on the upper side of the EXP k. When a cable such as a cable 404 shown in FIG. 4B is newly connected, a route element such as a route element "18" shown in FIG. 5B is newly added. Further, connection changing to change the terminal [P] of the EXP k to the terminal [P'] is performed. (Connection of new path)

{A3} A new cable or a new wire is connected to a terminal [Q'] on the lower side of the EXP m cut off at the above step (A1) and a route element corresponding to the new connection such as a route element "19" shown in FIG. 5B is added. If a route element corresponding to the new connection is already present in the routing table and the path 502 is "-" (non-use), the path 502 is set to a path (path 0) to be subjected to route switching. Further, connection changing for changing the terminal [Q] of the EXP m to terminal [Q'] is performed by the EXP m.

(B) Case where a cutoff portion is positioned on the lower side of the EXP k:

(B1) A lower side device (EXP n) 505 connected to the lower side of the EXP k and a terminal 506 corresponding thereto are acquired retrieving the routing table shown in FIG. 5A to cut off connection between the terminal [P] of the EXP k and the terminal [Q] of the EXP n. That is, the path 502 of the route element corresponding to this connection is changed from "0" to "-" (non-use). Further, cutoff of connection between the terminal [P] of the EXP k and the terminal [Q] of the EXP n is performed by the EXP k which is the upper side device. (Detection of cutoff portion and cutoff)

(B2) A cable of a wire constituting a route of a path (path 0) to be subjected to route switching is connected to the terminal [P'] on the lower side of the EXP k. When a new cable such as a cable 406 shown in FIG. 4B is connected, a route element such as a route element [18] shown in FIG. 5B is added. Further, connection switching to change the terminal [P] of the EXP k to terminal [P'] is performed. (Connection of original path)

(B3) A new cable or a new wire is connected to the terminal [Q'] on the upper side of the EXP n cut off at the above step (B1) and a route element corresponding to the new connection such as a route element [19] shown in FIG. 5B is added. If a route element corresponding to the new connection is already present in the routing table and the path 502 is "-" (non-use), the path 502 is set to a new path (path 1). Further, connection switching to change the terminal [Q] of the EXP n to the terminal [Q'] is performed by the EXP n. (Connection of new path)

A switching operation of each device required at a route switching time of a path can be determined according to the above processing.

Example 2

Figure 10:
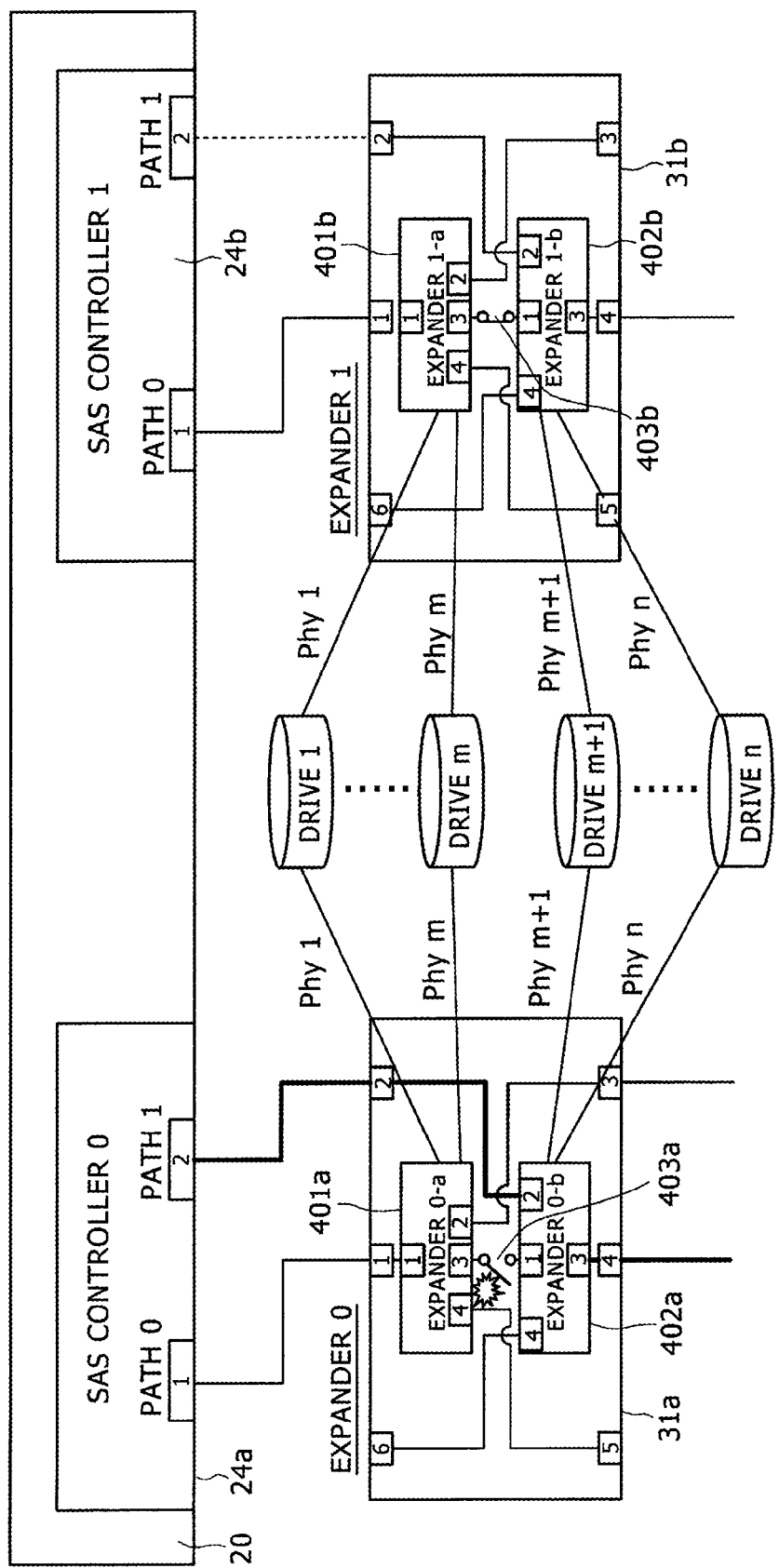
FIG. 10 is a diagram showing a cable connection when an SAS controller has a dual configuration in Example 2.

The case where one SAS controller 24 is used has been shown in Example 1, but a disk array system including two SAS controllers of an SAS controller 0 (24a) and an SAS controller 1 (24b), each having two paths of path 0 and path 1, the two SAS controllers accessing the same disk driving device (drives 1 to m and m+1 to n) is shown in Example 2. That is, in Example 2, a plurality of expanders 31 which is serially connected from the disk array device 20 by other systems, each expander 31 accessing the same disk driving device, is provided and other SAS controllers are connected to the respective systems. A system configuration in Example 2 is shown in FIG. 10. In Example 2, according to a dual configuration of the SAS controllers shown in FIG. 10, even if one SAS controller 0 (24a) is in a route-switching state, access to a disk driving device can be continued using the other SAS controller 1 (24b). That is, route switching is possible during ON.

A route switching processing in the SAS controller 0 (24a) is the same as shown in FIG. 4B. However, an expander connected to the SAS controller 0 (24a), which should be subjected to route switching is the expander 1 (31b). Further, an expander connected to the SAS controller 1 (24b) is the expander 1 (31b), and connections of a cable and a wire are the same as those shown in FIG. 4A.

A processing procedure for route switching during ON in the configuration shown in FIG. 10 is shown below.

(1) The Phy connecting an internal expander 0-a and an internal expander 0-b inside an expander 0 is cut off. The internal expander 0-a remains to belong to the path 0, and the internal expander 0-b is newly caused to belong to the path 1. Therefore, it is necessary to perform re-creation of the routing table of the expander 0 (causing drive management information (SAS address) belonging to the path 0 to belong to the path 1).

(2) In Example 1, the routing table is rewritten according to the route switching, as shown in FIG. 5A to FIG. 5B. In Example 2, as the routing table, an old table before updated and a new table after updated for the SAS controller 0 are included, and these tables are managed in a memory in a dual fashion, so that creation of a novel routing table (drive management information (SAS address 604) of the internal expander 0-b belonging to the path 0 is transferred to the path 1) is performed using the new table. Since the old table is made invalid on the side of the expander 0 during creation of the new table, a closed state occurs, so that the expander 1 continues to perform I/O action from the SAS controller 1 (24b) to the disk drive using the current routing table (the old table).

(3) After creation of the novel routing table on the side of the expander 0 is completed, the expander 0 uses the novel routing table and the side of the expander 0 handles I/O control to the driver. Therefore, the expander 1 holds overload.

(4) The Phy connecting the expander 1-a and the expander 1-b inside the expander 1 is cut off like the above item (1). The expander 1-a remains to belong to the path 0 and the terminal [2] of the SAS controller 1, the terminal [2] of the expander 1 are connected to each other by a cable shown by a broken line, and the expander 1-b is newly caused to belong to the path 1 of the SAS controller 1, thereby performing re-creation of a routing table on the side of the SAS controller 1. The side of the expander 1 is put in a closed state during creation of the routing table on the side of the SAS controller 1.

(5) After the routing table is created, two tables of the routing tables of the SAS controller 0 and the SAS controller 1 become novel routing tables and they can be put in a usable state together with the expander 0/1.

(6) Thereafter, the switch 403b between the internal expander 1-a and the internal expander 1-b is turned OFF.

As described above, in Example 2, during route switching of one of the expanders, the other expander uses the routing table before route switching to continue I/O to the disk drive, and during route switching of the other expander, the one expander performs I/O to the disk drive using the switched route. As a result, even during route switching, access to the disk driving device can be continued.

Example 3

In the configuration shown in FIG. 4B in Example 1, when route switching is performed, an expander 3 (31c) on the lower side of a route-switched portion (the internal expander 2-b (402)) has also been connected to the new path 1. In Example 3, route switching is performed such that only an internal expander 2-b (402) controlling the disk driving device (m+1 to n) of the RAID group #1 having high I/O load is connected to the new path 1, and an expander 3 (31c) on the lower side of the internal expander 2-b (402) remains to be connected to the original path 0. That is, Example 3 shows an example where affiliation of the (internal) expander is changed due to the route switching. Cable connection after route switching in Example 3 is shown in FIG. 11.

Figure 11:
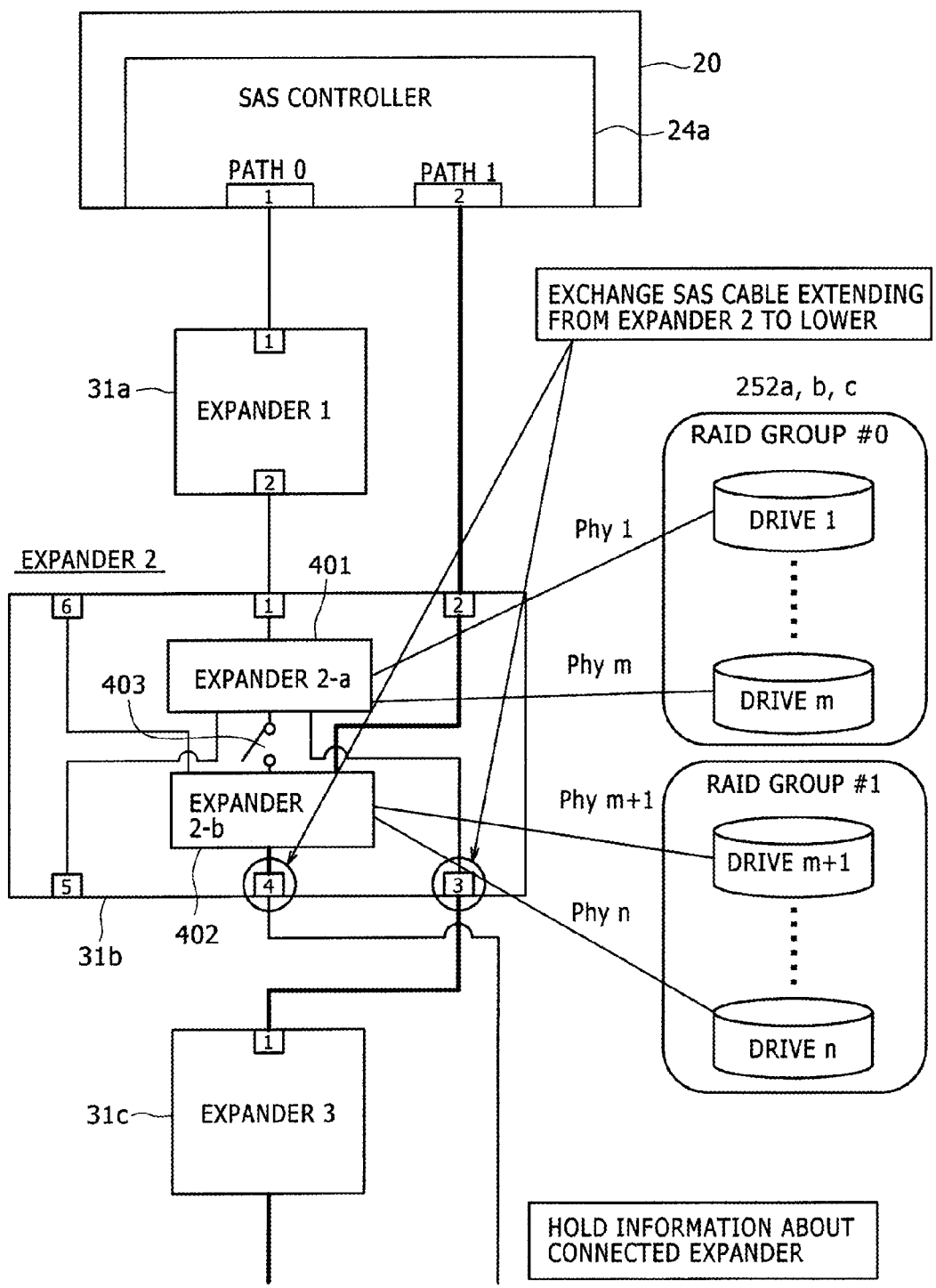
FIG. 11 is a diagram showing a belonging change of expanders in respective paths after route switching in Example 3.

A different point of the cable connection shown in FIG. 11 from that shown in FIG. 4B lies in that the terminal [4] of the expander 2 (31b) is connected with the cable 406 instead of the terminal [1] of the expander 3 (31c), and the terminal [3] of the expander 2 (31b) is connected to the terminal [1] of the expander 3 (31c) instead of the cable 406. That is, in FIG. 11, the connection destinations of the terminals [3] and [4] of the expander 2 (31b) in FIG. 4B have been exchanged with each other. The Exchange of the cables is performed by a manual operation.

As a result, the expander 1 (31b), the internal expander 2-a (401), and the internal expander 3 (31c) are connected to the path 0 of the SAS controller 24A, and only the internal expander 2-b (402) is connected to the path 1 of the SAS controller 24a. Therefore, regarding the internal expander 2-b (402) in the routing table shown in FIG. 5A, the path 502 is changed but the other path 502 is not changed.

Different points from FIG. 5B in Example 3 are as follows:
(1) The path 502 of the route element "17" is changed from "1" to "-".
(2) The path 502 of the route element "19" is changed from "0" to "-".
(3) As the route element "20", path=0, upper side device=EXP 2, terminal=3, lower side device=EXP 3, and terminal=1 are added.
(4) As the route element "21", "path=1, upper side device=EXP 2, terminal=4, lower side device=???, and terminal=?" is added.

According to the above processing, loads acting on the disk driving devices in the RAID group having high I/O load can be dispersed by performing such route switching that only the internal expander controlling the disk driving devices of the RAID group having high I/O load is changed to a new path but the other routes are not changed.

Example 4

The above Example is based upon that a place (connection between expanders including an internal expander) where a portion of a path is changed to a new route by newly connecting a cable for bottleneck elimination of I/O performance of a path has been found in advance. In Example 4, a route switching place in a path where I/O performance falls in a bottleneck is determined based upon the I/O amount of a plurality of disks handled by each expander. That is, when a new path is added to perform route switching, a route switching place (route changing point) is determined such that the total I/O amount associated with the original path (path 0) and the total I/O amount associated with the new path (path 1) are approximately equal to each other. As a result, each of the original path (path 0) and the new path (path 1) handles approximately a half of the total I/O amount, so that load dispersion of the I/O amount is performed to the respective paths approximately equally.

In the following explanation, n expanders of EXP 1, EXP 2, . . . EXP n are serially connected to the path from the SAS controller in the order nearer the SAS controller, and the I/O amount of each expander is represented as $X_k$ (K=1 to n). As shown in FIG. 4, when two partial expanders are included in each expander, each of partial expanders is regarded as one expander.

A partial sum of I/O amounts of expanders 1 to (K−1) is represented as $S_{k-1}=X_1+\ldots+X_{k-1}$, and the total sum of I/O amounts is represented as $S=X_1+\ldots+X_{k-1}+X_k+X_{k+1}+\ldots+X_n$.

(1) Determination of expander to be subjected to route switching:

While the I/O amounts of the respective expanders are sequentially added, the partial sum and the S/2 are compared with each other, so that when $S_{k-1}<S/2$ and $S_k \geq S/2$ are satisfied, EXP k is selected. That is, EXP k satisfying that the partial sum of the I/O amounts before addition of $X_k$ is equal to or less than a half of the total sum S but the partial sum of the I/O amounts after addition of $X_k$ becomes more than the half of the total sum S is detected.

(2) Determination of a path to which the determined expander belongs:

Further, whether a route switching place is positioned on the upper side (the side nearer the SAS controller) or the lower side of EXP k is determined by comparing $S_A$ and $S_B$ with each other, as $S_A=S_{k-1}$ and $S_B=X_{k+1}+\ldots+X_n$ ($S=S_A+X_k+S_B$).

(2-1) If $S_A \leq S_B$ is satisfied, the lower side of EXP k is set as the route switching place. That is, EXP 1 to EXP (K-1) belong to the path 0, while EXP (k-1) to EXP n belong to the path 1. At this time, since $|(S_A+X_k)-S_B| \leq |S_A-(X_k+S_B)|$ is obtained, a different between the partial sums of the I/O amounts of two paths becomes smaller by causing EXP k to belong to the path 0.

(2-2) If $S_A > S_B$ is satisfied, the upper side of EXP k is set as the route switching place. That is, EXP 1 to EXP (k-1) belong to the path 0, while EXP k to EXP n belong to the path 1. At this time, since $|(S_A+X_k)-S_B| > |S_A-(X_k+S_B)|$ is obtained, a difference between the partial sums of the I/O amounts of two paths becomes smaller by causing EXP k to belong to the path 1.

According to the above processing, a difference between the partial sums of the I/O amounts of the path 0 and the path 1 after route switching becomes minimum. That is, the partial sums of the I/O amounts of the respective path 0 and path 1 are approximately equal to each other.

There is a method where the disk array device 20 performs calculation of the route switching point based upon the accumulation value of the above-described I/O amounts to automatically determine the route switching point, thereby performing route switching, or a method where a calculation result of a route switching point is displayed on a management terminal and a user makes determination based upon the displayed result to determine a route switching point. In the latter method, the I/O amounts of the respective paths before and after route switching are displayed on the management terminal and the user determines the route switching point while referring to the displayed result.

REFERENCE SIGNS LIST

10 . . . host computer,
20 . . . disk array device,
21 . . . host I/F,
22 . . . RAID control unit,
23 . . . backend I/F,
24 . . . SAS controller,
25, 251 to 253 . . . disk driving device,
228 . . . route switching program,
31 . . . expander,
3143 . . . Phy connection management program,
3144 . . . Phy connection switching program,
401, 402 . . . internal expander,
403 . . . switch,
404 . . . SAS cable,
501 . . . (route element) No.,
502 . . . path,
503 . . . upper side device,
504, 506 . . . terminal,
505 . . . lower side device,
507 . . . Inside

The invention claimed is:

1. An access route switching method in a disk array system comprising a disk array device connected to a host computer and having at least one disk driving device, and at least one casing each having expanders added to the disk array device, each expander controlling at least one disk driving device, where the at least one casing is each connected to the disk array device via at least one path serially, wherein
the disk array device stores a routing table including information about a plurality of route elements constituting respective routes of the path and a device managing table managing information about the disk driving device for each RAID group;
when receiving an instruction of route switching to a predetermined path, specifies a cutoff portion of the expander to be subjected to the route switching based upon the routing table;
changes connection relationship between the route elements;
updates the routing table based upon a result of the change of the connection relationship; and
reflects information about the RAID group to be changed according to the change of the connection relationship to the disk managing table, further comprising:
when the cutoff portion is specified, acquiring a cutoff terminal and a connection terminal associated with the cutoff portion of the expander to be subjected to switching included in the instruction of the route switching based upon the routing table; and
when the connection relationship between the route elements is changed, changing connection inside the expander, associated with the cutoff terminal and the connection terminal, based upon the routing table, wherein
the expander has two internal expanders, each expander controlling the disk driving device for each RAID group, and
instructs change of the connection relationship to the internal expander when the connection relationship between the route elements is changed.

2. The access route switching method in a disk array system according to claim 1, wherein
a plurality of the expanders which accesses the same disk driving device, respectively, and is serially connected from the disk driving device by first and second systems, respectively, is connected to the disk array device; and
during route switching associated with a first expander included in the first system, a second expander corresponding to the first expander and included in the second system performs input and output control to the disk driving device.

3. The access route switching method in a disk array system according to claim 1, further comprising:
adding input/output amounts to the disk driving devices in a plurality of the expanders connected serially from the disk array device in the order of the connection nearer the disk array device to obtain a partial sum, and comparing the partial sum with a half of the total sum of input/output amounts of the plurality of the expanders to determine the expander to be subjected to the route switching.

4. An access route switching method in a disk array system comprising a disk array device connected to a host computer and having at least one disk driving device, and at least one casing each having expanders added to the disk array device, each expander controlling at least one disk driving device, where the at least one casing is each connected to the disk array device via at least one path serially, wherein
the disk array device stores a routing table including information about a plurality of route elements constituting respective routes of the path and a device managing table managing information about the disk driving device for each RAID group;
when receiving an instruction of route switching to a predetermined path, specifies a cutoff portion of the expander to be subjected to the route switching based upon the routing table;
changes connection relationship between the route elements;

updates the routing table based upon a result of the change of the connection relationship; and reflects information about the RAID group to be changed according to the change of the connection relationship to the disk managing table, wherein when the route switching regarding a third expander of the plurality of the expanders serially connected from the disk array device, the third expander being indirectly connected to the disk array device via another of the expanders, is received, route switching is performed such that a new path is set to the third expander and each of the expanders other than the third expander is connected to an original path thereof.

5. A disk array system comprising a disk array device connected to a host computer and having at least one disk driving device, and at least one casing having expanders added to the disk array device, each expander controlling at least one disk driving device, where each of the at least one casing is serially connected to the disk array device via at least one path, wherein the disk array device comprises:

a storage device storing therein a routing table including information about a plurality of route elements constituting respective routes of the path and a device managing table managing information about the device driving device for each RAID group; and a route switching control device, when receiving a route switching instruction to a predetermined path, specifies a cutoff portion of the expander to be subjected to the route switching based upon the routing table, changes a connection relationship between the route elements, updates the routing table based upon a result of the change of the connection relationship, and reflects information about the RAID group to be changed according to the change of the connection relationship to the device managing table, wherein the route switching control device, when the cutoff portion is specified, acquires a cutoff terminal and a connection terminal associated with the cutoff portion of the expander to be subjected to switching included in the instruction of the route switching based upon the routing table; and when connection relationship between the route elements is changed, changes connection inside the expander, associated with the cutoff terminal and the connection terminal, based upon the routing table, wherein the expander has two internal expanders, each expander controlling the disk driving device for each RAID group, and instructs change of the connection relationship to the internal expander when the connection relationship between the route elements is changed.

6. The disk array system according to claim 5, wherein a plurality of the expanders which access the same disk driving device, respectively, and is serially connected from the disk driving device by first and second systems, respectively, is connected to the disk array device; and during route switching associated with a first expander included in the first system, a second expander corresponding to the first expander and included in the second system performs input/output control to the disk driving device.

7. The disk array system according to claim 5, wherein when the route switching regarding a third expander of the plurality of the expanders serially connected from the disk array device, the third expander being indirectly connected to the disk array device via another expander, is received, route switching is performed such that a new path is set to the third expander, and each of the expanders other than the third expander is connected to an original path thereof.

8. The disk array system according to claim 5, further comprising:

adding input/output amounts to the disk driving devices in a plurality of the expanders connected serially from the disk array device in the order of the connection nearer the disk array device to obtain a partial sum, and comparing the partial sum with a half of the total sum of input/output amounts of the plurality of the expanders to determine the expander to be subjected to the route switching.

* * * * *